2,993,050
TELOMERS OF HYDROCARBON OLEFINS AND METHYL-CONTAINING CYCLIC ORGANIC COMPOUNDS
Anthony H. Gleason, Westfield, and Thomas M. Mozell, New Brunswick, N.J., assignors to Esso Research and Engineering Company, a corporation of Delaware
No Drawing. Filed Nov. 27, 1956, Ser. No. 624,519
13 Claims. (Cl. 260—290)

The present invention concerns telomers and the formation thereof by combining a hydrocarbon olefin with a cyclic compound that contains a methyl group.

This application is a continuation-in-part of patent applications Ser. No. 548,553 and Ser. No. 614,342, filed November 22, 1955, and October 8, 1956, respectively, both now abandoned.

The polymerization of diolefins in the presence of a sodium catalyst is an old art previously proposed for the preparation of rubber-like materials. It has also been known heretofore that where monomers of low purity are used or where the polymerization is carried out in the presence of inert solvents, non-rubbery, sticky, or even liquid products can be obtained. It has also been proposed to copolymerize the diolefin with an aromatic hydrocarbon, such as styrene. See for example U.S. Pat. No. 2,631,175 to Willie W. Crouch and U.S. Pat. No. 2,762,851 to Anthony H. Gleason. While the products thus obtained are excellent drying oils, forming films which have improved drying properties over polybutadiene itself, nevertheless the use of styrene in the necessary quantities increases the cost of the process because of the high cost of styrene.

It has now been found that when the polymerization is carried out in the presence of an organic compound containing an at least partially unsaturated ring having a methyl group attached thereto and an ether chosen from the group consisting of tetrahydrofuran, tetrahydropyran, methylal and dimethyl ether, at least a portion of the cyclic compound enters into the polymer as evidenced by a conversion above 100%.

According to the present invention 100 parts by weight of a hydrocarbon olefin containing 4 to 10 carbon atoms is polymerized in the presence of about 0.01 to 10 parts by weight of an alkali metal catalyst such as sodium, potassium, rubidium, cesium or the like, about 5 to 500 parts by weight of a methyl-containing cyclic organic compound such as a methyl aromatic, a methyl dicyclohydrocarbon or a methyl heterocyclic compound, and about 1 to 200 parts by weight of an ether selected from the group consisting of tetrahydrofuran, tetrahydropyran, methylal and dimethyl ether.

Among the olefins which will form these telomers are monolefins such as styrene and conjugated diolefins, especially diolefins containing 4 to 6 carbon atoms, such as butadiene-1,3, isoprene, piperylene, 2,3-dimethyl butadiene-1,3 and 2-methyl pentadiene.

If desired a mixture of monomers may be used which will copolymerize and combine with the cyclic compounds. For instance, methyl-containing cyclic organic compounds may be used to telomerize a mixture of butadiene-1,3 and isoprene or a mixture of butadiene-1,3 and styrene.

The telomerizing compounds should not contain any groups which interfere with the reaction or poison the catalyst, such as halogen, nitrile, or hydroxy groups. However, they may have alkyl, alkoxy or aryl groups attached to the ring in addition to the methyl group.

Telomerizing compounds, suitable for the purposes of the present invention have the following general formula:

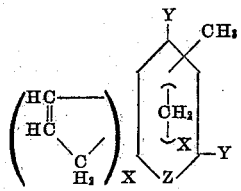

where X is 0 or 1; Y is an alkyl, alkoxy, aryl group or hydrogen; Z is carbon or nitrogen. The ring having the methyl group attached to it should be at least partially unsaturated. Of course there may be more than one methyl group attached to the ring.

Suitable methyl-containing cyclic organic compounds include methyl aromatics, such as xylene, toluene, ethyl toluene, trimethyl benzene, methyl naphthalene, etc., methyl methano indene, and heterocyclic compounds wherein nitrogen is the heteroatom, such as alpha methyl pyridine, 2,4-dimethyl pyridine, 2,4,6-trimethyl pyridine and homologs thereof. Of the foregoing the methyl pyridine compounds are much more reactive than the others. The uniqueness of these compounds is demonstrated by the fact that benzene and pyridine are not telomerizing agents.

A separate diluent is not essential because in many instances the telomerizing compounds serves this function. For example a liquid containing from about 10 to 100% methyl aromatics will perform such a dual function. The unincorporated portion of the methyl aromatic may be recovered, purified and reintroduced into the reactor. If a diluent is employed it should be used in an amount ranging from about 100 to 500, preferably 200 to 300 parts by weight per 100 parts of monomer and have a sufficiently high boiling range so as to be present as a liquid during the telomerization. Liquids boiling below the reaction temperature may be used providing the pressure is increased correspondingly. For convenience it is best to use diluents boiling between about −15° and 200° C. Suitable diluents include benzene, paraffins, naphthenes etc.

An important feature of the present invention involves the use of tetrahydrofuran, tetrahydropyran, methylal or dimethyl ether as promoters for the telomerization. While they are effective promoters at concentrations as low as 1 part by weight and as high as 200 parts by weight per 100 parts by weight of monomer, concentrations ranging from about 10 to 50 parts, and preferably 15 to 35 parts by weight per 100 parts by weight of monomer, result in the formation of suitable telomers in most instances.

Often it is also advantageous to use about 1 weight percent to 50 weight percent, preferably 10 to 20 weight percent based on the alkali metal or about 0.1 to 1 weight percent based on monomers, of a $C_2$ to $C_{10}$ aliphatic alcohol, such as isopropanol, secondary butanol, tertiary butanol, n-propanol and n-pentanol. Such alcohols have been found to act as catalyst promoters. The coarser the catalyst dispersion, the more essential it is to have a sufficient amount of alcohol promoter present.

The telomerization may be carried out at a temperature between about 0 and 105° C., preferably between above 25° C. and below 70° C., until a substantially complete telomerization takes place. The usual batch reaction time ranges from several days at 30° C. to about 15 minutes at 95° C. It is desirable to operate with a catalyst particle size of about 1 to 100 microns, preferably about 10 to 50 microns. Such a catalyst can be prepared by dispersing the molten alkali metal in a suitable hydrocarbon at 100° C. to 130° C. by means of a homogenizer such as an Eppenbach Homo-Mixer and cooling the resulting dispersion below the melting point of sodium to prevent coalescence of the dispersed sodium particles.

The catalyst is usually fed to the reactor as a slurry of metal particles dispersed in 2 to 200 parts of a hydrocarbon solvent. For example, in large-scale operations it is possible to operate with catalyst slurries containing one part of sodium dispersed in 3 to 5 parts of hydrocarbon liquid, whereas in bench-scale runs it is more practical to use catalyst slurries containing one part of sodium dispersed in 50 to 100 parts of carrier liquid. Agitation of the reaction mixture during synthesis increases the efficiency of the catalyst.

Destruction of catalyst at the end of the reaction can be effectively accomplished, for example, by treating the crude product with clay or a slight excess of an acid such as glacial acetic acid or sulfuric acid, whereupon the mixture is neutralized with ammonia, and the neutralized product is finally filtered with a filter aid such as silica gel, clay, charcoal or its equivalent. Where the telomer contains a basic component, such as a methyl pyridine, it is better to destroy the active portion of the catalyst with carbon dioxide.

The resulting product may have a viscosity between about 0.05 to 5000 poises, after the volatile matter has been removed, depending on the amount of telomerizing compound used as well as other conditions. Low viscosity telomers are in the range between about 0.05 and 100 poises at 25° C. as measured by the Gardener Bubble Viscometer. The telomers generally contain between about 1 and 60 weight percent of the telomerizing agent and about 40 to 99 weight percent of olefin. The low viscosity telomers may contain about 15 to 60 weight percent of telomerizing agent and about 40 to 85 weight percent of olefin. The nitrogen content of telomers prepared with nitrogen-containing compounds may vary between about 0.15 to 9 weight percent.

The product's viscosity can readily be increased by heat-bodying the oil in the absence of air at temperatures between 200 and 300° C., e.g. at 220 to 260° C. as described in U.S. Patent No. 2,672,425 of Gleason and Leary, issued March 16, 1954. The clear, solvent-free, low viscosity compositions can be brushed, poured or sprayed to give clear, hard, tack-free varnish films on drying in air or baking, especially when moderate amounts of conventional driers such as the naphthenates or octoates of cobalt or manganese are added thereto.

Furthermore, where the low viscosity telomers are used in pigmented enamels, their gloss and wetting power can be further improved by reacting them with a small amount of a polar compound such as maleic anhydride, acrylonitrile, thioglycollic acid or other equivalent modifying materials described in U.S. Patents 2,652,342 and 2,683,162.

The low viscosity telomers may also be oxidized by blowing with air or oxygen in the presence or absence of a hydrocarbon solvent as taught in copending application Serial No. 498,111 to McKay and Jasper in order to improve the properties of films prepared therefrom. The telomers may also be used in making resins, and potting compounds or as adhesives and lubricants.

The invention will be better understood from the subsequent illustrative examples. In these examples, as in all other portions of this specification, when quantities are stated in "parts," it will be understood that reference is had thereby to "parts by weight," unless expressly indicated otherwise.

EXAMPLE 1

A series of telomers was prepared in accordance with the following recipe which was placed in a two-liter stainless steel bomb provided with a mechanical agitator:

|  | Parts |
|---|---|
| Monomers | 100 |
| Diluent | 200 |
| Ether modifier | 30 |
| Isopropanol | 0.4 |

To the above recipe 2 parts of finely dispersed sodium in the form of a dispersion in 100 parts of diluent (sodium particle size 30–50 microns) were added. After closing, the reactor was heated to 50° C. and the reaction mixture agitated at that temperature for 18 hours. After cooling to room temperature, 15 ml. of glacial acetic acid were added to the reactor and allowed to react until the sodium was consumed. Excess acetic acid was neutralized by bubbling ammonia gas through the reaction mixture, and the resulting sodium and ammonium salts were separated therefrom by filtration. Finally the polymer contained in the filtered hydrocarbon solution was concentrated by vacuum distillation at 70 to 100° C. until all solvent was removed. The following data were obtained:

Table 1

| Run | Monomers | | Ether | Diluent | | Conversion | Viscosity/100% N.V.M., poises |
|---|---|---|---|---|---|---|---|
| | Butadiene | Styrene | | | | | |
| 1 | 80 | 20 | TF 30 | Heptane | 300 | 100 | 12.3 |
| 2 | 80 | 20 | D 30 | do | 300 | 100 | >1,066 |
| 3 | 80 | 20 | D 30 / TF 30 | do | 300 | 100 | >1,066 |
| 4 | 80 | 20 | TF 30 | Varsol | 300 | 130 | 1.8 |
| 5 | 100 | | TF 30 | Heptane / Xylene | 250 / 50 | 125 | 0.85 |
| 6 | 100 | | TF 30 | Heptane / Xylene | 150 / 150 | 132 | 0.65 |
| 7 | 100 | | TF 100 | Heptane / Xylene | 250 / 50 | 107 | 12.9 |
| 8 | 100 | | D 30 | Varsol | 300 | 100 | >1,066 |
| 9 | 100 | | D 30 | Toluene | 300 | 100 | >1,066 |
| 10 | 100 | | TF 30 / VBE 30 | do | 300 | 104 | >1,066 |
| 11 | 100 | | TP 30 | Solvesso "100" | ᵃ 100 | 145 | 0.55 |
| 12 | 100 | | TF 30 | do | ᵃ 300 | 135 | 0.85 |
| 13 | 100 | | F 30 | Toluene | 300 | 18 | |
| 14 | 100 | | TF 30 | Benzene / Heptane | 150 / 150 | 103 | 55 |
| 15 | 100 | | TF 30 | Et-Benzene / Heptane | 150 / 150 | 95 | 3 |
| 16 | 100 | | M 50 | Heptane / Toluene | 100 / 200 | 105.5 | 65 |
| 17 | 100 | | M 30 | do | 300 | 125 | 62 |
| 18 | 100 | | DME 30 | do | 400 | ᵇ 130–150 | 1–2 |

DME=dimethyl ether; TF=tetrahydrofuran; TP=tetrahydropyran; D=dioxane; M=methylal; F=furan; VBE=vinyl butyl ether.
ᵃ Mixture of trimethyl and methyl ethyl benzenes.
ᵇ Combination of several runs.

Varsol contains 15 to 30% methylated aromatics and other aromatics, 30 to 40% paraffins and about 40% naphthenes and boils in the range between 150 and 200° C. Solvesso 100 contains 96+% methylated and other aromatics and boils in the range between 160–175° C.

The above data show that when tetrahydrofuran, tetrahydropyran, methylal and dimethyl are used as the ether promoters in conjunction with a methylated aromatic hydrocarbon-containing solvent some of the aromatic solvent enters into the reaction inasmuch as conversions of more than 100% are obtained. As shown in run No. 7, the viscosity of the product increases with increasing amounts of tetrahydrofuran. At the same time the conversion decreases showing that less aromatic compounds enter the polymer molecule. Furthermore a product is often obtained having a viscosity below 9 poise at 100% NVM. However, runs No. 3 and 10 show that the presence of other ethers neutralizes any effect the tetrahydrofuran may have upon the viscosity and conversion. When run 1 is compared with runs 4, 5, 6, 7, 11, 12, 16 and 17, it is evident that the methylated aromatic enters the molecule as evidenced by the increased conversion over 100%. Runs 8, 9 and 13 show that dioxane and furan do not promote any reaction between the methylated solvent and the butadiene. Furthermore, run 10 shows that vinyl butyl ether fails to promote the coreaction of the butadiene with the aromatic hydrocarbons and even nullifies the effect of the tetrahydrofuran.

EXAMPLE 2

A group of telomers were prepared by reacting 100 parts of butadiene-1,3 with 200 parts of methyl dicyclopentadiene in the presence of 40 parts of either tetrahydrofuran or tetrahydropyran, 2 to 3 parts of finely divided (30–50 microns) sodium, 200 parts of benzene and 0.25 part of isopropanol in a two liter stainless steel bomb provided with a mechanical agitator. The reactions were carried out at 70° C. for 17 hours after which time they were cooled and neutralized according to the procedure used in Example 1. To illustrate the necessity of having methyl groups attached to the ring, in one of the runs dicyclopentadiene was substituted for methyl dicyclopentadiene. The percent conversion based on the diolefin and viscosity at 25° C., obtained in each run are set forth below:

Table II

| Telomerizing Agent | Viscosity at 100% NVM, Poises | Percent Conversion | Promoter |
|---|---|---|---|
| Dicyclopentadiene | 25 | 100 | Tetrahydrofuran. |
| Methyl Dicyclopentadiene. | 4.3 | 140 | Do. |
| Do | 15 | 143 | Tetrahydropyran. |

The data show that while methyl dicyclopentadiene will telomerize, dicyclopentadiene will not. Furthermore the methyl dicyclopentadiene must be free of monomer since in another experiment it was found that methyl cyclopentadiene poisons the sodium catalyst. In addition no telomerization was observed when dioxane was used as the promoter.

The telomers obtained above contained about 26 to 37 weight percent of the dimer and had iodine numbers between about 250 and 270 cg./g.

Where 200 parts of methyl dicyclopentadiene were reacted with 100 parts of isoprene in the presence of 40 parts of tetrahydrofuran, 3 parts of finely divided sodium and 200 parts of a paraffinic diluent boiling in the range between 165 and 185° C. under the same conditions used above, a 123% conversion on the isoprene and a telomer having a viscosity of 14 poises at 100% NVM was obtained.

EXAMPLE 3

The following recipe was charged to a 1.4 liter pressure bottle and tumbled for 18 hours at 50° C.

|  | G. |
|---|---|
| Odorless solvent [1] | 300 |
| Butadiene | 100 |
| γ-Collidine | 100 |
| Tetrahydrofuran | 40 |
| Sodium dust | 2.5 |
| Isopropanol | 0.25 |

[1] Composed of paraffinic hydrocarbons boiling in the range of 165–185° C.

The crude product was filtered and stripped to a bottoms temperature of 105° C. at 2 mm. pressure. The residue was a dark colored oil weighing 170 g., a 170% conversion based on the diolefin, and containing 4.53% nitrogen. Its viscosity was 14 cp. Based on the material balance and nitrogen content the product contains about 40% collidine, equivalent to 3.5 butadiene molecules in a chain terminated by a collidine molecule and having a molecular weight of about 300. Obviously these are average values since the product is a complex mixture covering a range of viscosities, molecular weights or chain lengths.

When the amount of γ-collidine in the above recipe was reduced to 50 g. the conversion, based on butadiene, dropped to about 145% and the viscosity of the product increased to 65 cp. In another run 30 grams of γ-collidine was reacted with butadiene-1,3 and resulted in a conversion of 121% and a viscosity of 92 cp.

EXAMPLE 4

Using 40 g. of alpha picoline in place of the γ-collidine in the recipe of Example 3 the product consists of a mixture of oily telomers having a viscosity of 50 cp. and a nitrogen content of 3.8%. The conversion was 140% based on diolefin.

EXAMPLE 5

In the following recipe isoprene was polymerized in the presence of alpha picoline for 65 hours at 50° C.

|  | G. |
|---|---|
| Odorless solvent [1] | 300 |
| Isoprene | 100 |
| Alpha picoline | 50 |
| Tetrahydrofuran | 30 |
| Sodium | 3 |
| Isopropanol | 0.25 |

[1] Same solvent used in Example 3.

Filtering and stripping the crude product up to 110° C. at 1 mm. pressure gave 142% conversion of telomeric material, based on the diolefin, having a viscosity of 22 cp.

EXAMPLE 6

When 50 g. of 2,4 lutidine was substituted for the 100 g. of γ-collidine in Example 3 a product was obtained in 148 g. yield (148% conversion based on the diolefin) having a viscosity of 25 cp. The nitrogen content of the telomer was 3.74%.

EXAMPLE 7

The following recipe gave a conversion of 100% based on monomers plus picoline showing that ternary types of telomers can also be prepared.

|  | G. |
|---|---|
| Odorless solvent [1] | 300 |
| Styrene | 20 |
| Butadiene | 80 |
| Alpha picoline | 50 |
| Tetrahydrofuran | 40 |
| Sodium | 3 |
| Isopropanol | 0.25 |

[1] Same solvent used in Example 3.

150 grams of product containing 4.53% nitrogen was recovered having a viscosity of 41 cp.

In general, the methylated pyridines give somewhat higher conversions (on diolefin) and lower average viscosities than the methylated aromatics. In other words, they telomerize more efficiently and are consumed more rapidly than the methylated aromatics at low concentrations.

The products of the invention may be used in drying oils, potting compounds and the like, but with a nitrogen containing group at one end of the chain salts and quaternary compounds may be prepared which possess surfactant properties. For example, methyl iodide which is an alkyl halide was reacted with a methyl pyridine-butadiene-1,3 telomer and a strongly surface active quaternary salt was obtained.

EXAMPLE 8

Certain multi methylated pyridines, such as γ-collidine and 2,4 lutidine, will react with butadiene-1,3 to form a telomer in the absence of ether promoters, such as tetrahydrofuran. However, the conversion is lower when the telomerization is carried out in the absence of an ether promoter. For instance, 50 parts of γ-collidine was reacted for 17 hours at 50° C. 100 parts of butadiene-1,3 in the presence of 200 parts of an aromatic diluent boiling between about 150 and 200° C., 2.5 parts of finely divided sodium and 0.25 part of isopropanol. A 133% conversion was obtained based on the butadiene and the telomer had a viscosity of 0.22 poise at 100% NVM. Furthermore, this is completely unexpected since alpha picoline requires a promoter.

The nature of the present invention having been thus fully set forth and a specific example of the same given, what is claimed as new and useful and desired to be secured by Letters Patent is:

1. A process for the preparation of polymer oils which comprises mixing 100 parts by weight of an unsaturated hydrocarbon chosen from the group consisting of styrene and conjugated diolefins of 4 to 6 carbon atoms, 5 to 500 parts by weight of a diluent chosen from the group consisting of xylene, toluene, ethyl toluene, trimethyl benzene, methyl naphthalene, methyl methanoindene, alpha picoline, 2,4-lutidine, gamma-collidine, and methyl dicyclopentadiene, 1 to 200 parts by weight of an ether chosen from the group consisting of dimethyl ether, methylal, tetrahydropyran, and tetrahydrofuran, and 0.01 to 10 parts by weight of finely divided alkali metal; and maintaining the resulting mixture at a temperature between 0° and 105° C.

2. Process according to claim 1 in which the unsaturated hydrocarbon is butadiene-1,3.

3. Process according to claim 1 in which the unsaturated hydrocarbon is a mixture of butadiene-1,3 and styrene.

4. Process according to claim 1 in which the diluent is toluene.

5. Process according to claim 1 in which the diluent is xylene.

6. Process according to claim 1 in which the diluent is methyl dicyclopentadiene.

7. Process according to claim 1 in which the diluent is gamma-collidine.

8. Process according to claim 1 in which the diluent is alpha-picoline.

9. Process according to claim 1 in which the diluent is 2,4-lutidine.

10. Process according to claim 1 in which the ether is dimethyl ether.

11. Process according to claim 1 in which the ether is tetrahydrofuran.

12. Process according to claim 1 in which the ether is tetrahydropyran.

13. Process according to claim 1 in which the ether is methylal.

References Cited in the file of this patent

UNITED STATES PATENTS

| | | |
|---|---|---|
| 1,934,123 | Hofmann et al. | Nov. 7, 1933 |
| 2,446,792 | Shelton et al. | Aug. 10, 1948 |
| 2,514,928 | Bishop et al. | July 11, 1950 |
| 2,522,981 | Bachman et al. | Sept. 19, 1950 |
| 2,603,655 | Strain et al. | July 15, 1952 |
| 2,636,036 | Dubois et al. | Apr. 2, 1953 |
| 2,688,044 | Pines et al. | Aug. 31, 1954 |
| 2,692,286 | Stayner | Oct. 19, 1954 |
| 2,714,620 | Leary | Aug. 2, 1955 |
| 2,721,886 | Pines et al. | Oct. 25, 1955 |
| 2,748,178 | Pines et al. | May 29, 1956 |
| 2,826,569 | Cislak | Mar. 11, 1958 |

OTHER REFERENCES

Wegler et al.: Chem. Ber., vol. 83, pages 6–10 (1950).